(12) United States Patent
Zurecki et al.

(10) Patent No.: US 6,564,682 B1
(45) Date of Patent: May 20, 2003

(54) MACHINE TOOL DISTRIBUTOR FOR CRYOGENIC COOLING OF CUTTING TOOLS ON A TURRET PLATE

(75) Inventors: Zbigniew Zurecki, Macungie, PA (US); Michael David Buzinski, Slatington, PA (US); William T. Zaboy, New Tripoli, PA (US); Robert Ellsworth Knorr, Jr., Allentown, PA (US); Robert Bruce Swan, Lehighton, PA (US); Xiaoguang Zhang, Macungie, PA (US); George Matthew Harriott, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 210 days.

(21) Appl. No.: 09/712,675

(22) Filed: Nov. 14, 2000

(51) Int. Cl.[7] .............................. B23B 3/06; B23B 3/16
(52) U.S. Cl. ............................... 82/50; 82/52; 82/120; 407/11
(58) Field of Search ........................... 82/50, 52, 901, 82/173, 120; 409/135, 136, 137; 407/5, 6, 11; 408/56, 58, 61

(56) References Cited

U.S. PATENT DOCUMENTS

| | | | |
|---|---|---|---|
| 3,971,114 A | * 7/1976 | Dudley | 407/120 |
| 4,164,879 A | 8/1979 | Martin | 82/2 R |
| 5,103,701 A | * 4/1992 | Lundin et al. | 407/11 |
| 5,265,505 A | 11/1993 | Frechette | 82/159 |
| 5,509,335 A | 4/1996 | Emerson | 82/1.11 |
| 5,592,863 A | * 1/1997 | Jaskowiak et al. | 407/11 |
| 5,761,974 A | 6/1998 | Wang et al. | 82/1.11 |
| 5,862,833 A | 1/1999 | Perez | 137/625.11 |
| 5,901,623 A | 5/1999 | Hong | 82/50 |

* cited by examiner

Primary Examiner—Henry W. H. Tsai
(74) Attorney, Agent, or Firm—Robert J. Wolff (57) ABSTRACT

A cryogenic fluid distributor for turret machine tools (e.g., lathes) directs a stream of cryogenic fluid from an external, pressurized cryogen source to a working position of a machine tool to prevent overheating of the tool. Designed for easy retrofitting and synchronizing with multi-tool turret machines, the distributor allows for a "dual-fluid" machining capability combining a cryogenic fluid and a conventional cutting fluid (flowing via a conventional coolant system built into a given machine tool). Made of low thermal-mass, insulating polymer and metallic parts, the distributor utilizes the different thermal contraction coefficients of the parts to establish cryogenic sealing connections, which eliminates undesired turret plate cooling and assures rapid cryogen flow start-up.

17 Claims, 6 Drawing Sheets

MACHINE TOOL DISTRIBUTOR FOR CRYOGENIC COOLING OF CUTTING TOOLS ON A TURRET PLATE

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention relates to machine tool cooling and to systems for supplying coolants to tools for cutting and other machine operations, and more particularly to distributors of cryogenic fluids for cooling tools mounted on a rotatable turret plate.

Examples of prior art devices and methods for cryogenic cooling tools in machining operations are disclosed in U.S. Pat. No. 5,761,974 (Wang, et al.) and U.S. Pat. No. 5,901,623 (Hong). These patents recognize that cryogenic cooling of tools for shaping parts by removing material is advantageous for its cleanliness, absence of the environmental impacts characterizing conventional cutting fluids, and improved tool life due to reduced tool wear rates.

However, the implementation of cryogenic cooling is difficult for tools mounted on rotationally indexing turret plates commonly used on machines like lathes or machining centers using a computerized numerical controller (CNC). Flowing from an external, pressurized source, the cryogen has to enter a machine carriage holding turret, which typically moves in two traverse directions (X-Z) and then proceeds to the specific tool that is engaged in a cutting operation at a given moment and has been mounted together with other tools on a multi-tool, rotationally indexing turret plate.

A turret-lathe coolant system disclosed in U.S. Pat. No. 5,265,505 (Frechette) is relatively simple to synchronize with the characteristic, rotational indexing of tools and may be retrofitted on the majority of modern CNC machines because the distribution valve and tubing are added on the top (or front) part of the turret. Unfortunately, the distributing valve, sealing and mounting mechanisms, as well as tubing used in the described apparatus, would certainly leak and eventually fail in a pressurized cryogenic fluid service, while the turret plate would suffer thermal shrinkage affecting dimensional accuracy of machined parts. The same comments apply to U.S. Pat. No. 5,862,833 (Perez), which discloses a somewhat improved sealing mechanism but requires a more complex retrofitting procedure and, because of an extensive conductive contact of the distributor with the turret plate, would result in significant dimensional inaccuracies during machining with a cryogenic fluid.

U.S. Pat. No. 4,164,879 (Martin) discloses a coolant system for a machine tool having a rotatable turret. The system includes a distributor mounted on the turret (coaxial with the axis of rotation of the turret) for directing coolant to a tool that has been indexed to the working position. The distributor includes a rotatable member (that rotates with the turret) in which a non-rotatable member is disposed. The rotatable member has a plurality of radially disposed passages which transmit coolant from the non-rotatable member to tool-receiving sockets on the turret. A check valve assembly in each socket and actuator members on selected tools selectably regulate the flow of coolant to tools in the working position. This coolant system would have many problems if used with cryogenic fluids, including moisture condensation and freezing of moving parts, leakage of low-viscosity cryogenic fluids through incompatible sealing components in which each material contracts thermally to a different degree while all elastomeric components become brittle, dimensional inaccuracy of an inadvertently cooled turret plate, etc.

Problems with dimensional accuracy and transfer efficiency characterizing valves distributing cryogenic fluids to cutting.tools in machining applications have been recognized in U.S. Pat. No. 5,509,335 (Emerson). The turret-plate distribution system taught in this patent features an actuated plunging valve which disconnects or connects tubing communicating with specific tools via a plunger seat according to the rotational indexing procedure called upon by a machining CNC program. While minimizing thermal shrinkage problems, this system requires a complete redesign of the turret, something highly impractical in a production environment, making quick retrofits impossible. Moreover, the plunging valve synchronization with the indexing action of the turret is not simple, and the reliability or life of the plunger seat is limited.

It is desired to have a distributor for delivering a liquid or two-phase stream of a cryogenic fluid (e.g., liquid nitrogen) to a specific tool mounted on a multi-tool turret and engaged in a machining operation, such as cutting.

It is further desired to have a distributor of a cryogenic fluid that can be easily installed on existing machines quickly and simply.

It is still further desired to have a cryogenic fluid distributor for cooling a machine tool that does not eliminate the capability of machining operations with conventional cutting fluids and does not preclude the option of simultaneously using a conventional fluid system and a cryogenic tool cooling system.

It is still further desired to have a cryogenic fluid distributor for cooling a machine tool that is affordable in the (low-margin driven) machining industries.

It is still further desired to have a distributor for delivering a cryogenic fluid which eliminates the possibility of cooling the tool-holding turret plate to prevent thermally induced dimensional inaccuracies in machined parts, and which operates in a liquid cryogen leak-free mode.

It is still further desired to have a distributor for delivering a cryogenic fluid which maximizes the use of thermally insulating materials and components, and which is characterized by a minimum thermal mass that can be cooled-down quickly so that only negligible, transient vapor choking would occur during warm start-ups of cryogenic flow, which may be required in the case of significantly interrupted machining operations.

It also is desired to have a distributor for delivering a cryogenic fluid which is reliable in operation, has no fast wearing parts, offers a simple synchronization with the rotational indexing of the turret plate, and never fails or seizes in a way that will damage machine tools, components, or parts being machined.

BRIEF SUMMARY OF THE INVENTION

The present invention is a distributor of a cryogenic fluid for cooling at least one machining tool mounted on a rotatable turret plate. The cryogenic distributor can be retrofitted on conventional machine tools in such a way that the distributor does not eliminate the capability of machining operations with conventional cutting fluids.

A first embodiment of the invention includes a polymeric rotor, a metallic stator, and a self-sealing means. The polymeric rotor has a first coefficient of thermal expansion and a cavity within the rotor. The metallic stator has a first end, a second end, a first longitudinal axis, and a second coefficient of thermal expansion. A substantial portion of the stator is disposed in the cavity within the rotor, thereby forming at least one interface between the stator and the rotor. With regard to the self-sealing means, a difference between the first coefficient of thermal expansion and the second coefficient of thermal expansion results in at least one seal at the at least one interface between the stator and the rotor when the cryogenic fluid flows through at least a portion of the stator. In a variation of the first embodiment, the rotor may be disposed within a vapor jacket, thereby forming an annulus between the vapor jacket and the rotor.

Various cryogenic fluids may be used with the distributor. For example, the cryogenic fluid may be selected from the group consisting of cryogenic nitrogen, cryogenic argon, cryogenic carbon dioxide, cryogenic helium, and any combinations and mixtures thereof having a temperature less than or equal to minus 80° Celsius. Flow of the cryogenic fluid to the distributor may be regulated by a flow control means, such as a flow control box.

In a preferred first embodiment, the distributor also includes a first metallic counter-shrink plate and a second metallic counter-shrink plate. The first metallic counter-shrink plate has an axis parallel to the first longitudinal axis and is mounted on the stator adjacent the second end of the stator within the cavity. The second metallic counter-shrink plate is mounted on the stator parallel to and above the first metallic counter-shrink plate within the cavity. The distributor also includes a first low-friction interface means between the stator and the first metallic counter-shrink plate, and a second low-friction interface means between the stator and the second metallic counter-shrink plate.

In another embodiment, the distributor also includes a post tube and a connecting arm. The post tube is attached to a turret carriage. The connecting arm has a first end connected to the stator and a second end connected to the post tube. In a variation of this embodiment, the length of the connecting arm is adjustable.

Another aspect of the present invention is a machine including at least one machining tool and a distributor of a cryogenic fluid for cooling the at least one machining tool as in the first embodiment discussed above.

In a second embodiment of the present invention, the distributor includes a conduit, a polymeric rotor, a metallic stator, and first and second metallic counter-shrink plates. The conduit has a first and a second end, the first end being in communication with a supply of the cryogenic fluid. The polymeric rotor has a first end, a second end, an outer wall between the first and second ends, an inner wall between the first and second ends, and a first longitudinal axis. The outer wall is substantially symmetrical about the first longitudinal axis, and the inner wall is substantially symmetrical about the first longitudinal axis and forms a substantially symmetrical cavity within the rotor between the inner wall and the first longitudinal axis. The rotor is rotatable about the first longitudinal axis and has at least one radial passage adjacent the second end of the rotor between the inner and outer walls of the rotor. Each radial passage is substantially equally spaced from a neighboring radial passage, substantially equidistant from the second end of the rotor, and has an inlet, an outlet and another longitudinal axis angularly spaced from the first longitudinal axis. A substantial portion of the metallic stator is disposed in the cavity within the rotor. The stator has a first end above first end of the rotor and a second end above the second end of the rotor. The stator has a first passage coaxial with the first longitudinal axis and a second passage having a second longitudinal axis angularly spaced from the first longitudinal axis. Each of the passages has an inlet and an outlet. The inlet of the first passage is in communication with the second end of the conduit; the outlet of the first passage is in communication with the inlet of the second passage; and the outlet of the second passage is adaptable to be in communication with the inlet of the at least one radial passage. The first metallic counter-shrink plate, which has an axis parallel to the first longitudinal axis, is mounted on the stator adjacent the second end of the stator within the cavity. The second metallic counter-shrink plate is mounted on the stator parallel to and above the first metallic counter-shrink plate within the cavity. In a variation of this embodiment, the another longitudinal axis of each radial passage is substantially perpendicular to the first longitudinal axis, and the second longitudinal axis of the stator is substantially perpendicular to the first longitudinal axis.

In a preferred second embodiment, the distributor also includes a first low-friction interface means between the stator and the first metallic counter-shrink plate, and a second low-friction interface means between the stator and the second metallic counter-shrink plate. The distributor also includes individual tubes in communication with and extending from each of the individual radial passages. Also, the second end of the rotor is connected to the turret plate. Preferably, the second end of the stator is spaced apart from the turret plate.

BRIEF DESCRIPTION OF THE DRAWINGS

The invention will be described by way of example with reference to the accompanying drawings, in which.

DETAILED DESCRIPTION OF THE INVENTION

The present invention is a cryogenic fluid distributor for turret machine tools (e.g., lathes) which directs a stream of cryogenic fluid from an external, pressurized cryogen source to a working position of a machine tool to prevent overheating of the tool. Designed for easy retrofitting and synchronizing with multi-tool turret machines, the distributor allows for a "dual-fluid" machining capability combining a cryogenic fluid and a conventional cutting fluid (flowing via a conventional coolant system built into a given machine tool). Made of low thermal-mass, insulating polymer and metallic parts, the distributor utilizes the different thermal contraction coefficients of the parts to establish cryogenic sealing connections, which eliminates undesired turret plate cooling and assures rapid cryogen flow start-up.

Figure 1:
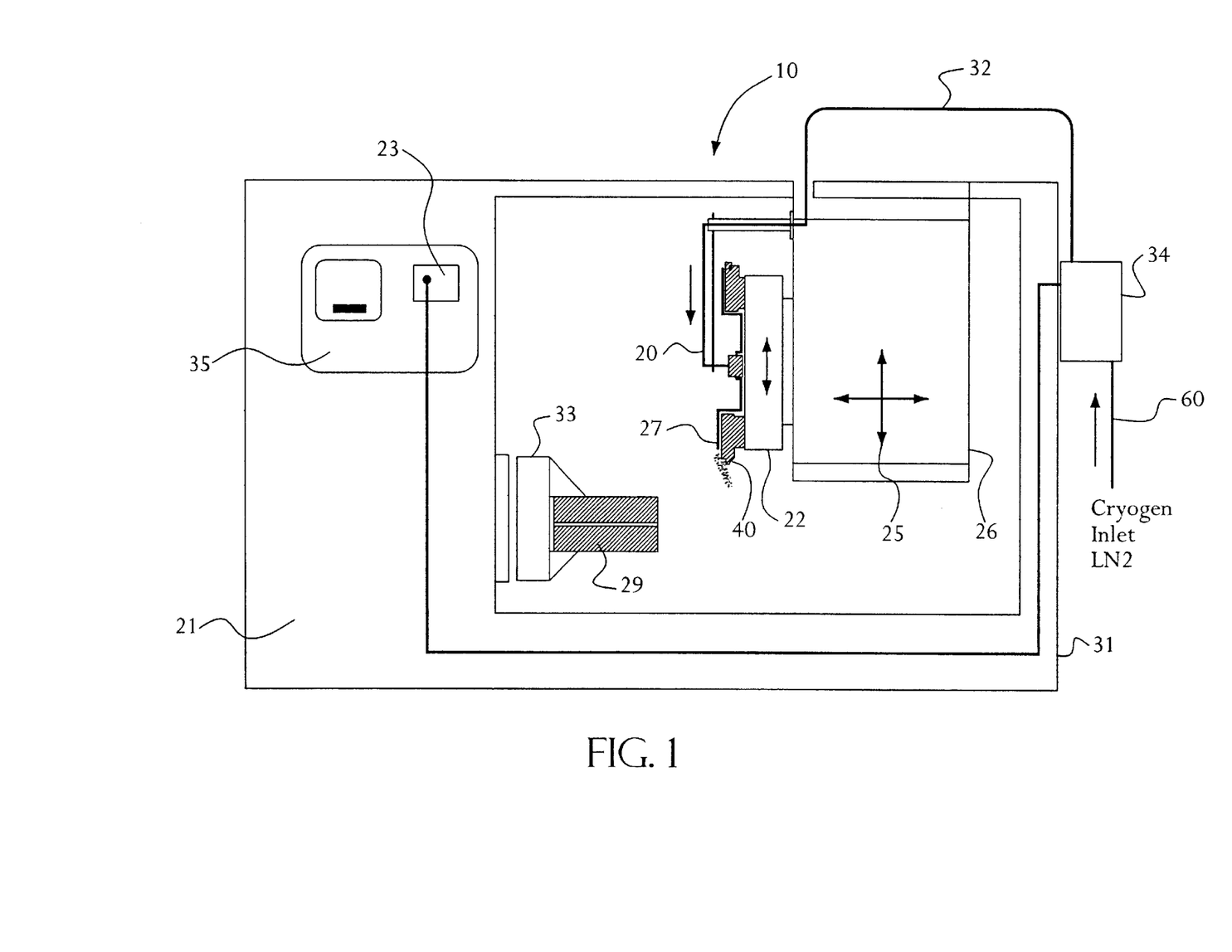
FIG. 1 is a schematic diagram of an embodiment of the present invention in connection with a horizontal machining center (lathe) utilizing a computerized numerical controller (CNC)

FIG. 1 shows the cryogenic coolant distributor system 10 installed on a machine tool 21 (e.g., a lathe) for machining a workpiece 29 held by a chuck 33. Flow of the coolant (e.g., LN2) via cryogen supply line 60 to the system is regulated by flow control box 34 mounted on a plant wall 31 or another stationary object. The embodiment illustrated in FIG. 1 utilizes a computerized numerical controller (CNC) (not shown). The panel switch control 23, which is part of the control panel 35 for the CNC, is connected to the flow control box. The flow control box may be of the type disclosed in a co-pending patent application by Zbigniew Zurecki, et al. assigned to Air Products and Chemicals, Inc. having docket number 06091 USA and having USPTO Ser. No. 09/712,680, which co-pending application is incorporated herein by reference.

Figure 2:
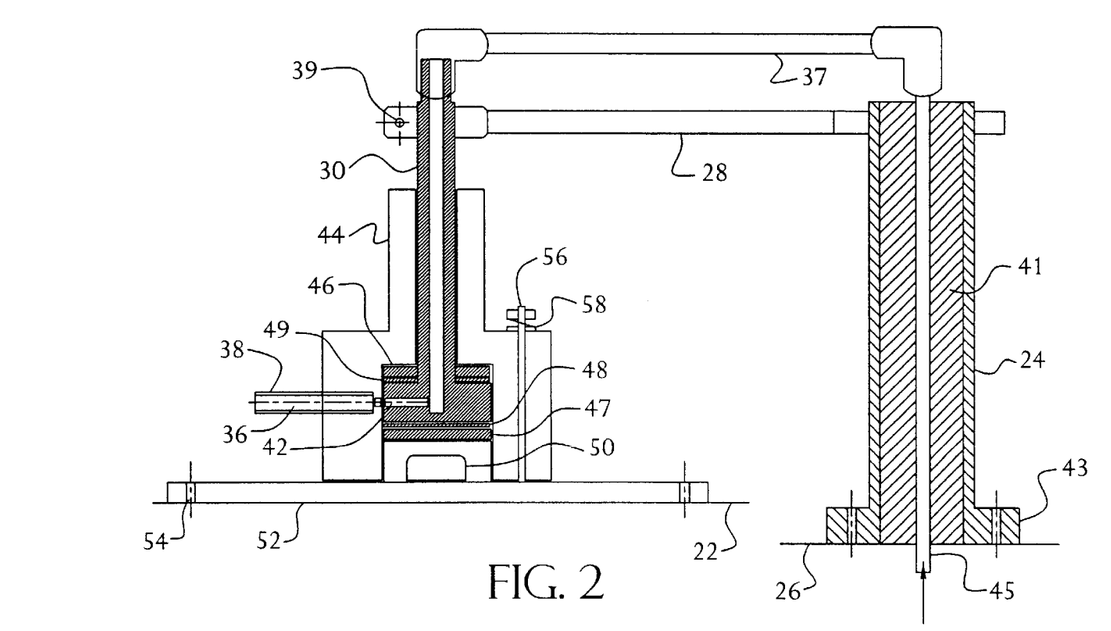
FIG. 2 is a partial cross-sectional view illustrating the distributor and connected components for an embodiment of the present invention.

FIG. 2 shows a distributor 20 to be mounted on the turret face of an indexing turret plate 22 (shown in FIG. 1 but not shown in FIG. 2).

Referring to FIGS. 1 and 2, the distributor system 10 includes a distributor 20 bolted to the face of the turret plate 22 in its axial position, a post tube 24 attached to the side of a turret carriage 26, a connecting rod 28 (or counter-torque rod) attached at one end to a stator 30 and anchored at the opposite end to the post tube, and the flexible cryogen delivery line 32 feeding cryogen from a pressurized cryogen vessel (not shown) or other source via cryogen supply line 60 and a flow control box 34 to the distributor. Cryogen from the distributor is sprayed on the tool 40 by an active nozzle 27.

Figure 3:
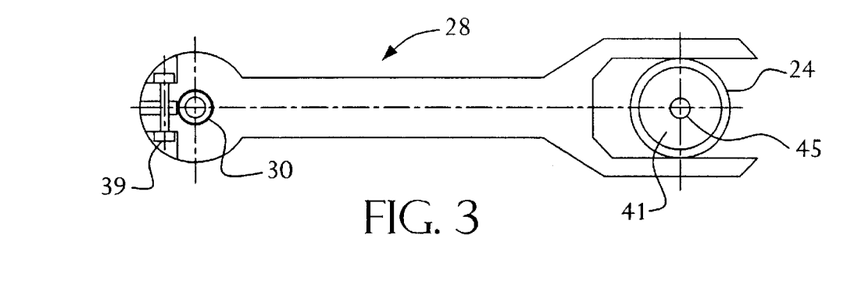
FIG. 3 is a top view of a connecting rod illustrating one means for connecting it to a post tube and to a stator component of the distributor of the present invention.

FIG. 3 illustrates one way of attaching the connecting rod 28 to the stator 30 and the post tube 24. As shown, attachment to the stator uses a key-hole coupling and a mounting bolt 39. (Persons skilled in the art will recognize that the torque coupling also may be accomplished in other ways.) Attachment to the post tube may utilize a fork-shaped end of the connecting rod as shown in FIG. 3.

Figure 4:
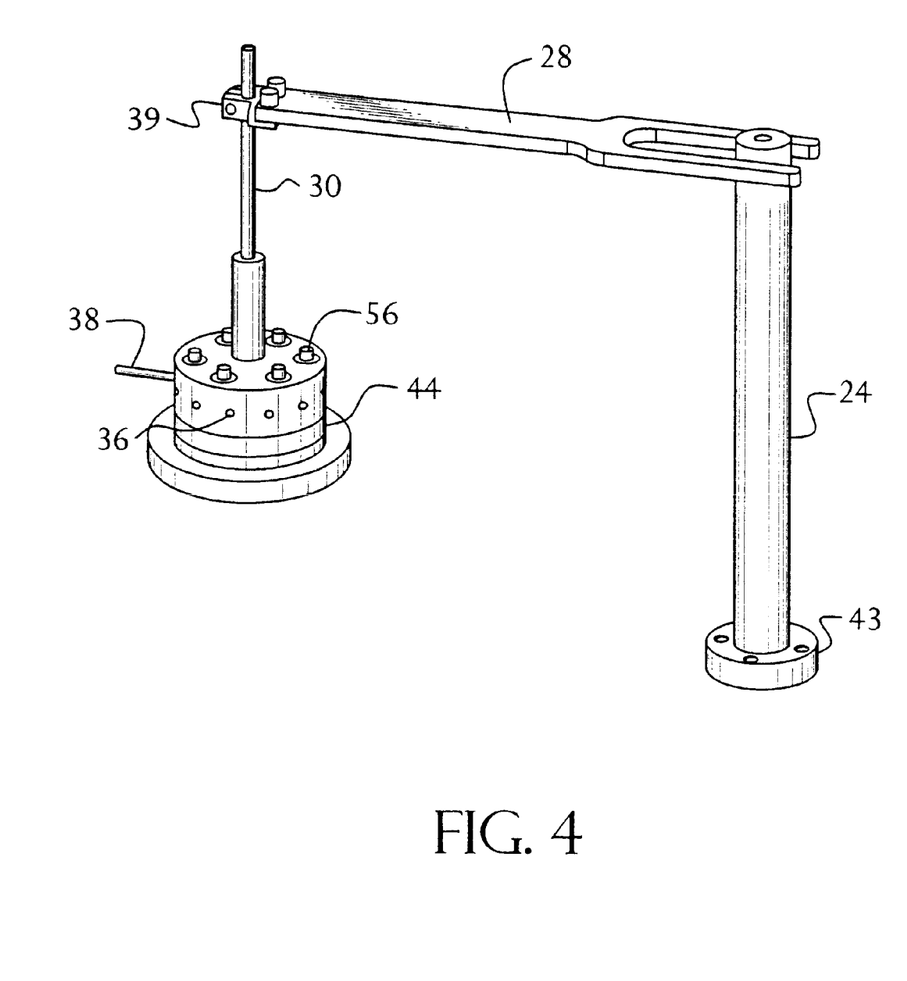
FIG. 4 is a perspective view illustrating one embodiment of an assembled distributor of the present invention prior to mounting the distributor on an indexing turret plate and an X-Y traversing turret carriage.
Figure 4A:
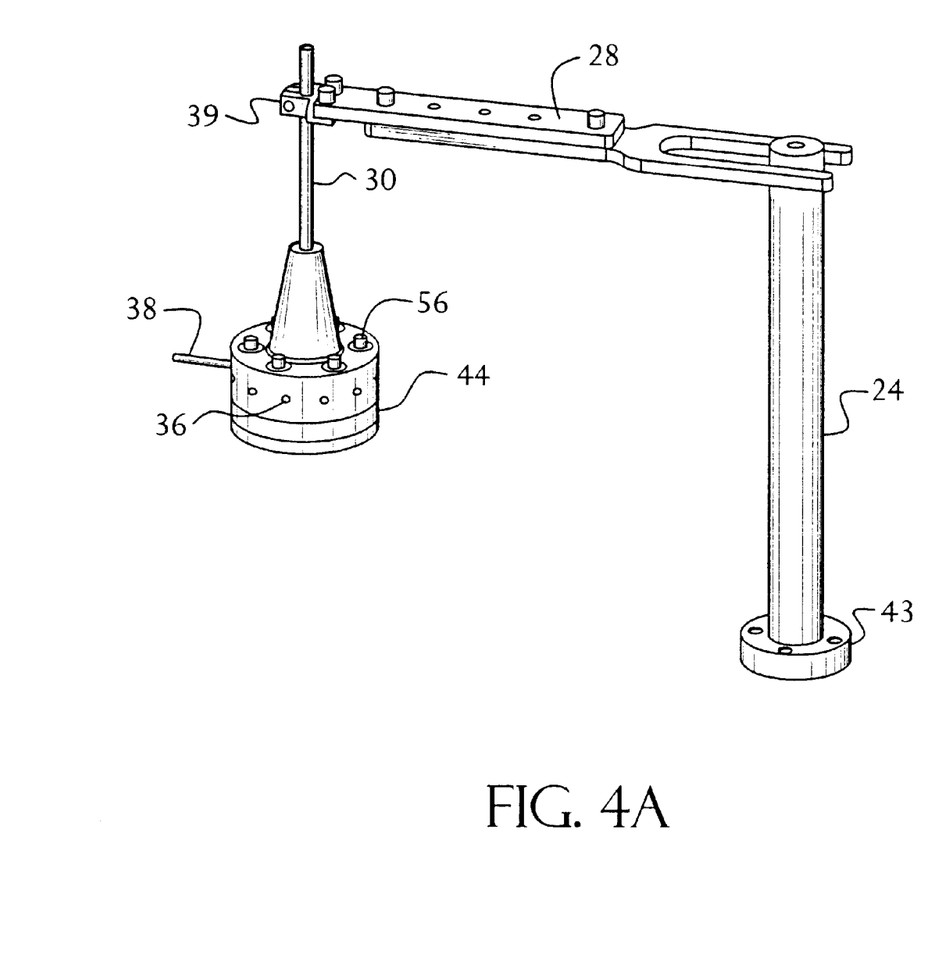
FIG. 4A is a perspective view illustrating another embodiment of an assembled distributor of the present invention prior to mounting the distributor on an indexing turret plate and an X-Y traversing turret carriage.

As shown in FIGS. 4 and 4A there are multiple ports 36 in the rotor 44 of the distributor 20. Each port has a tube 38 extending from the port to transmit cryogen to an individual tool. This configuration allows the delivery of a cryogenic fluid to each tool 40 in work position (FIG. 1) even though the turret plate 22 on which the tools are mounted traverses in the X and Y directions (as indicated by arrows 25 in FIG. 1), while the turret plate can rotationally index tools from one work position to another, which is characteristic of the operation of a modern machining center utilizing a computerized numerical controller (CNC).

The distributor system 10 may operate with any cryogenic fluids that are inert under ambient conditions, including but not limited to cryogenic nitrogen, cryogenic argon, cryogenic carbon dioxide or cryogenic helium supplied under saturated, two-phase (boiling) and subcooled conditions and within a broad range of pressures from about 5 to 250 psig. However, since at present only liquid nitrogen (LN2 or LIN) can be used as an economic, cost-saving tool-cooling medium in typical low-margin machining centers, LN2 is used in the following discussion of the present invention.

The distributor 20 includes a metallic stator 30 (or plunger) with one radial hole 42 in a fixed angular position, surrounded by a polymeric rotor 44 with a number of evenly distributed radial ports 36 corresponding to the number of tool positions on the turret plate 22. Typical turret plates have 10 or 12 tool positions and typical rotors have 10 or 12 symmetrical, radial ports 36 positioned 36° or 30° apart from each other.

The preferred materials of construction are 300-series stainless steel for the stator 30 and a Teflon®-(carbon composite (with 5–35 vol % carbon or graphite) for the rotor 44. (Teflon® is a registered trademark of E.I. DuPont de Nemours Company (DuPont).) Made of the same alloy as the stator are two "counter-shrink" metal plates (46, 47) placed one on the top and the other on the bottom of the mushroom-shaped, large-diameter stator. The diameters of these round plates are the same as or a slightly smaller than the diameter of the wide section of the stator, and the plates are kinematically separated from the stator using a low-friction interface, e.g., thin, metallic or non-metallic gasket-inserts, like a carbon or brass foil (48, 49).

Referring to FIG. 2, a polymeric filler plate 50 (an insulator) is located directly under the bottom counter-shrink metal plate 47 and closes the bottom opening of the polymeric rotor 44 directed to the face of the turret plate 22. The filler plate prevents convective and/or radiant cooling of the turret plate by the cryogen flowing through the stator 30. For convenience in mounting the distributor 20 on turret plates, a stainless steel mounting plate 52 is provided. The mounting plate has radially distributed holes 54 for attaching to the turret plate from the bottom side and a set of long stainless steel bolts 56 for mounting the rotor body on the top side. The mounting plate stays at room temperature during operation since it is thermally insulated from the cryogenically cold stator. Protruding through the sidewall of the rotor, the long mounting bolts are terminated with spring-loaded components 58 (e.g., spring washers and nuts), which provide a constant loading force regardless of the temperature. Without this spring loading the rotor would become loose during the LN2 flow phase, since the polymeric rotor would shrink more than the metallic bolts.

The elongated inlet end of the stator 30 is kinematically connected to a "counter-torque" connecting rod 28, which cannot change its angular position because it is anchored on the post tube 24. Thus, even when the rotor 44 and the tubes 38 extending from the ports 36 to individual tools rotate with the turret plate 22, the stator stays in the same angular position held by the counter-torque connecting rod. For convenient retrofitting of machine tools having turret plates of different diameters, the end of the connecting rod adjacent the post tube can be shaped like a fork as shown in FIG. 3. FIGS. 4 and 4A illustrate two different configurations of the distributor-rod-post set prepared for mounting on a turret plate. The adjustable-length connecting rod 28 shown in FIG. 4A provides for flexibility to use the distributor with different size machines.

A precondition for proper operation is the alignment of the radial hole 42 in the stator 30 with the port 36 of the tube 38 leading to the tool in work position. This is done by loosening the connection between the connecting rod 28 and the stator 30, aligning the two holes and tightening the connection again. An angular error in the initial alignment may result in choking the cryogenic flow through the stator-rotor connection and a vapor locking in the downstream tubing (due to a decompressive boiling of the cryogen), which would be counterproductive.

The system is started up by opening the cryogen supply line 60 and admitting a cryogen stream via the flexible delivery line 32 to inlet tubing 45 in the post tube 24, then to the stator 30 via connecting tubing 37. (In the preferred embodiment, both the inlet tubing and the connecting tubing are made of Teflon®, as is filler tube 41 in the post tube.) If all components were at room temperature during the start, what comes first from the distributor 20 and the tubing is a cold vapor produced as the components cool to the temperature of the cryogen. Seconds later, the stream turns to a two-phase flow, then to a liquid flow. The polymer of the rotor 44 becomes cold and fully contracted on the perimeter of the metallic stator, thereby establishing a cryogenic seal between the port 42 of the stator 30 and the multi-tool ports 36 in the rotor 44.

Figure 5:
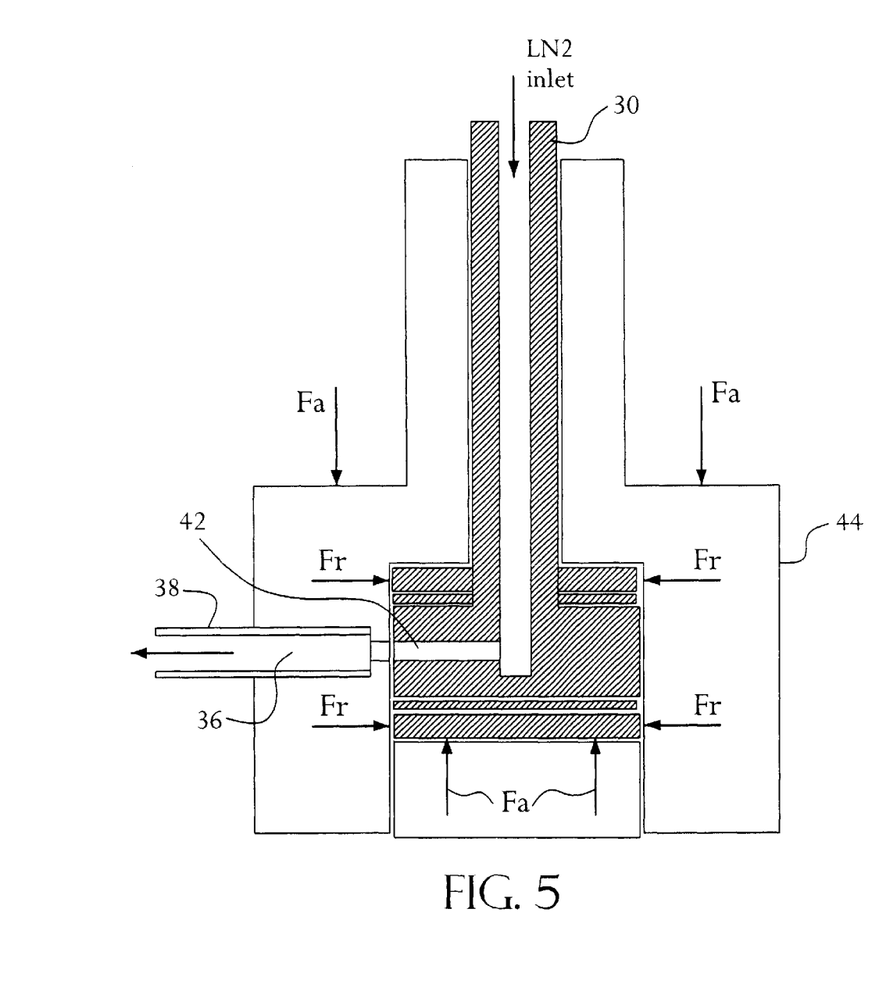
FIG. 5 is a schematic cross-sectional view of the stator and rotor of the distributor of the present invention illustrating the sealing forces inside a cryogenic coolant distributor.

Since the difference in the contraction between Teflon® composites and stainless steel parts cooled by LN2 can reach about 1.5%, the contraction would seize the stator 30 inside the rotor 44, thereby excluding any relative rotation, if not for the two metallic counter-shrink plates (46, 47), which prevent that from occurring. It was surprising to discover during performance tests with LN2 that it was these plates which were seized inside the rotor, allowing the stator located in between the plates (in the axial direction) to easily rotate within the rotor cavity whenever the friction between the plates and the stator was reduced by introducing sliding gaskets or solid lubricant foils (48, 49). Although the distribution of actual thermal and sealing stresses is not fully understood, in view of frequent cryogen start-ups and shut-downs required in a typical machining service, it appears that the axial force (Fa) and the radial force (Fr) generated by a cryogenically cold rotor, as shown in FIG. 5, provide for the required peripheral sealing and axial alignment of the distributor. In tests with a prototype, when cryogenic distributors did not have the counter-shrink plates and/or the sliding separations between the plates and the large-diameter bottom of the stator, the apparatus was permanently seized or started to leak and failed after only a few weeks in operation.

The subsequent steps in a typical machining and distributor operation involve turret plate rotations for indexing new tools to work position. As the turret rotates from one position to another, the stator hole sees only a blind wall of the rotor body and the cryogen flow is stopped. As soon as the turret is indexed to a new position, which typically takes one second or less, the cryogen flow is restored via a new port in the rotor. Since the distributor stays cryogenically cold during such an indexing step, the flow to a new tool is restored within a second rather than many seconds required in the case of the first warm start-up.

It is a common practice in machining operations that only some tool positions at a turret plate are filled in. In such a case, the unused tool ports in the rotor can be conveniently plugged with metallic rods or bolts in order to prevent any machining debris from entering into contact with the rotor-stator interface. The cryogenic shrink-fit seal between these plugs and the polymer rotor was found to be sufficient in preventing leakage even if a plugged port is moved into work position under a full cryogen delivery pressure. One of these unused ports also can be used as an accelerated venting device, convenient during warm start-ups with strongly boiling cryogenic streams containing a large fraction of vapor.

Figure 6:
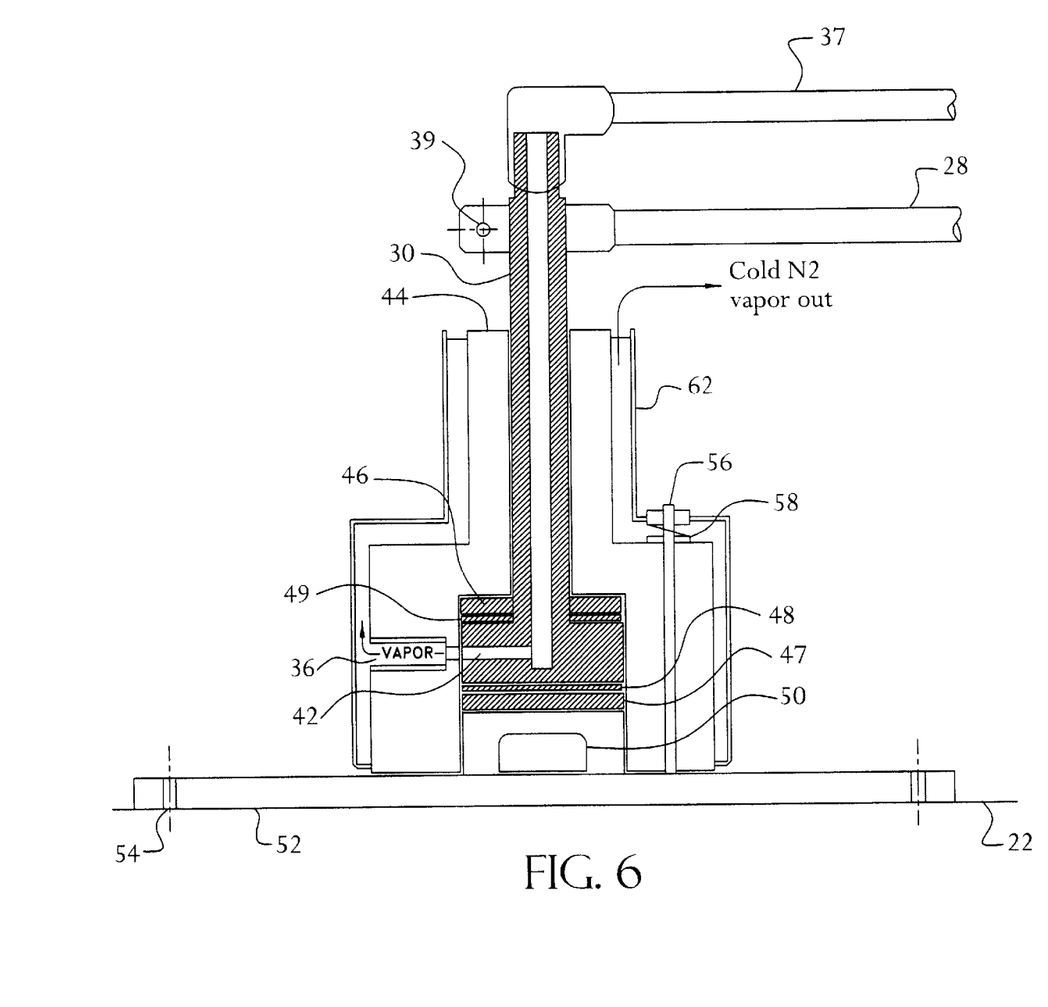
FIG. 6 is a schematic partial cross-sectional view illustrating another embodiment of the present invention including a vapor containing jacket for rapid venting of vapor at warm start-up.

FIG. 6 shows this modification involving a loosely fitted vapor jacket 62 surrounding the rotor 44 and directing the initial vapor flow from the unused ports 36 around the distributor 20. As a high vapor-fraction cryogen is first admitted to the distributor, the turret is rotated to the position with the open port, the cold vapor flows through the vapor jacket, accelerates the cool-down of the rotor and the stator 30, then leaves through the top opening into the machine's work area. A few seconds later, the turret plate 22 can be rotated back to its required machining tool position to start the machining cycle with a fully established cryogenic coolant flow. The vapor jacket option assures rapid system start-ups even if the quality of the cryogen supplied to the machine tool is poor.

EXAMPLES

Two conventional CNC lathes were retrofitted with the cryogenic distributor system in order to enable the use of liquid nitrogen coolant in selected, high-speed and/or rough turning operations, which generated a large amount of heat on cutting tools consisting of ½" square carbide inserts attached to larger toolholders mounted on turret plates. The first, a 20 HP lathe, was equipped with a 14" diameter, round turret plate for 12 tools; the second, a 40 HP lathe, used an angularly shaped turret plate with a mean diameter of 20" and 10 tool positions to fill in. Both lathes were equipped with a standard emulsion fluid cooling system, which supplies the cutting fluid from the back side of the turret via a plunger through channels drilled in the turret plate and individual toolholders. Also, there were small, 3" and 8" diameter round steel lids bolted in the axis of both turret plates which covered the turret bearing mechanism from the face side. Since the available LN2 sources and transfer lines assured delivery of a non-boiling cryogen, it was decided to install the type of distributor shown in FIG. 4 rather than its vapor shrouded modification shown in FIG. 6. The following were the distributor installation and start-up steps in both cases.

First, the face lids were removed and replaced with appropriately sized stainless steel transition plates detailed in FIG. 2. Next, preassembled distributors were mounted on the transition plates. The first lathe used the rotor with 12 radial ports, and the second lathe used the rotor with 10 radial ports. Holes were drilled in the steel sheet covering turret carriages and the post tubes were mounted therein. A ¼" diameter LN2 transfer tubing was connected to the stators and post tubes, while a flexible LN2 delivery tubing was introduced from the top of the turret carriage as shown on FIG. 1. The stator holes were aligned with the ports leading to tools in work position and the connecting rods (counter-torque rods) were connected to the stators and post tubes.

According to the CNC machining program, the lathes were to use two roughing tools with the LN2 cooling and another two tools (for drilling) with the conventional emulsion cooling. Thus, two appropriate rotor ports were connected to the LN2-cooled tools with ⅛" diameter stainless steel tubing and the other ports were plugged. On the first warm start-up, the distributor cool-down took about 15 seconds, at which point a good quality LN2 stream was sprayed at the selected roughing tool in the work position in a stable, non-pulsing manner. This tool was operated with the LN2 cooling for the next 12 minutes, after which the turret was indexed to the next LN2-tool position, which immediately reconvened the cutting operation to run another 10 minutes non-stop. Later, the drilling tools were indexed to the work position and the conventional coolant was used during drilling. There was no frost or other indications of a turret plate cooling during the entire CNC cycle, and the only frosted parts of the apparatus were uninsulated tubes transferring LN2 to and from the distributor, never in contact with the turret itself.

In each case analyzed, the preparation and installation of the distributor system on the lathe took less than 2 hours and, even with the dual-fluid machining method elected, the two LN2-cooled tools allowed for a nearly 60% increase in productivity over the conventional part machining cycle.

The main distinctive features of the present invention are:

1. The cryogenic distributor system can be easily and quickly mounted on existing turret lathes capable of dry machining or equipped with a conventional cutting fluid system. In the latter case, the present invention provides a "dual coolant" capability, which means the fluid used for a particular machining operation could be a cryogenic fluid, a conventional cutting fluid, or both at the same time, if an enhanced tool cooling along with lubrication are desired. This combination of both fluids markedly enhances the machining process envelope but has not been technically feasible with the prior art equipment and methods. Since lathe retrofitting requires only bolting the cryogenic distributor to the center face of the turret plate (using already existing screws) and bolting the post-tube to the turret carriage that executes the X-Y traverse motions, the installation of the system is significantly simpler and less expensive than in the case of the prior art. Also, the counter-torque connecting rod, fixing the angular position of the stator with respect to the post-tube and the carriage, can now be significantly simpler than either a multi-rod linkage or an actuated plunger requiring a separate synchronization with the turret indexing, both suggested in the prior art.
2. The distributor uses a unique cryogenic sealing system based on the difference in the thermal expansion coefficients of the materials of construction while preventing rotational seizure with the help of two round counter-shrink steel plates. Found in tests to be unexpectedly effective, this simple design solution drastically reduces fabrication costs and improves reliability and life time of the cryogenic fluid distributor.
3. Since the distributor body is made of a thermally insulating material (Teflon® composite), and there is no direct, conductive contact between the cryogenically cold metal stator and the metallic turret plate, the undesired cooling of the turret by the cryogen is prevented, and the dimensional tolerances during machining are preserved.
4. Because of the higher thermal contraction of the Teflon®) composite rotor, metallic tubes directing cryogen from the rotor to individual tools mounted on the turret can be connected using a simple shrink-fit principle which makes rearrangements of the tooling and the system quick and easy. There is no need for more complex rotor-to-tubing fittings.
5. Looking at the distributor system from the side of the work area of the machine, occasionally filled with sharp and fast flying chips, all cryogen passages are fully protected and "hard-piped," since the only flexible portion of delivery tubing required extends up-stream of the carriage. This allows the use of hard, chip-resistant tubing and prevents plugging of the cryogenic ports and connectors with debris and fines, which otherwise could lead to a rapid system failure.
6. The distributor and method of operation allows for a rapid delivery of subcooled as well as saturated and boiling cryogen to a desired tool even if the flow starts at room temperature ("warm start-up"). This is done by venting the vapor during the first 1–3 seconds of the flow through a spare port in the rotor, which may be executed either by introducing an extra CNC programming line into a machining sequence or manually by indexing a turret plate to the spare port, then returning to the position occupied by the work tool. The initial vapor vented away during this start-up is utilized in the vapor-containing jacket where it cools the mass of the rotor and thereby accelerates system cool-down and reaching the point of thermal stability. No prior art distributor offers such a fast cool-down and cryogen flow start-up capability.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A distributor of a cryogenic fluid for cooling at least one machining tool mounted on a rotatable turret plate, comprising:

a polymeric rotor having a first coefficient of thermal expansion and a cavity within the rotor;

a metallic stator having a first end, a second end, a first longitudinal axis, and a second coefficient of thermal expansion, a substantial portion of the stator being disposed in the cavity within the rotor, thereby forming at least one interface between the stator and the rotor; and a self-sealing means, wherein a difference between the first coefficient of thermal expansion and the second coefficient of thermal expansion results in at least one seal at the at least one interface between the stator and the rotor when the cryogenic fluid flows through at least a portion of the stator.

2. A distributor as in claim 1, further comprising:

a first metallic counter-shrink plate, having an axis parallel to the first longitudinal axis, mounted on the stator adjacent the second end of the stator within the cavity; and a second metallic counter-shrink plate mounted on the stator parallel to and above the first metallic counter-shrink plate within the cavity.

3. A distributor as in claim 2, further comprising a first low-friction interface means between the stator and the first metallic counter-shrink plate.

4. A distributor as in claim 2, further comprising a second low-friction interface means between the stator and the second metallic counter-shrink plate.

5. A distributor as in claim 1, wherein the rotor is disposed within a vapor jacket, thereby forming an annulus between the vapor jacket and the rotor.

6. A distributor as in claim 1, further comprising:

a post tube attached to a turret carriage; and a connecting arm having a first end connected to the stator and a second end connected to the post tube.

7. A distributor as in claim 6, wherein the connecting arm is adjustable in length.

8. A distributor as in claim 1, wherein the cryogenic fluid is selected from the group consisting of cryogenic nitrogen, cryogenic argon, cryogenic carbon dioxide, cryogenic helium, and combinations and mixtures thereof having a temperature less than or equal to minus 80° Celsius.

9. A machine including at least one machining tool and a distributor of a cryogenic fluid for cooling the at least one machining tool as in claim 1.

10. A distributor as in claim 1, wherein flow of the cryogenic fluid to the distributor is regulated by a flow control means.

11. A distributor of a cryogenic fluid for cooling at least one machining tool mounted on a rotatable turret plate, comprising:

a conduit having a first and a second end, the first end being in communication with a supply of the cryogenic fluid;

a polymeric rotor having a first end, a second end, an outer wall between the first and second ends, an inner wall between the first and second ends, and a first longitudinal axis, the outer wall being substantially symmetrical about the first longitudinal axis, and the inner wall being substantially symmetrical about the first longitudinal axis and forming a substantially symmetrical cavity within the rotor between the inner wall and the first longitudinal axis, said rotor being rotatable about the first longitudinal axis and having at least one radial passage adjacent the second end of the rotor between the inner and outer walls of the rotor, each said radial passage being substantially equally spaced from a neighboring radial passage, substantially equadistant from the second end of the rotor, and having an inlet, an outlet, and another longitudinal axis angularly spaced from the first longitudinal axis;

a metallic stator having a first end above the first end of the rotor and a second end above the second end of the rotor, a substantial portion of the stator being disposed in the cavity within the rotor between the inner wall and the first longitudinal axis, the stator having a first passage coaxial with the first longitudinal axis and a second passage having a second longitudinal axis angularly spaced from the first longitudinal axis, each of said passages having an inlet and an outlet, the inlet of the first passage being in communication with the second end of the conduit, the outlet of the first passage being in communication with the inlet of the second passage, and the outlet of the second passage adaptable to be in communication with the inlet of the at least one radial passage;

a first metallic counter-shrink plate, having an axis parallel to the first longitudinal axis, mounted on the stator adjacent the second end of the stator within the cavity; and a second metallic counter-shrink plate mounted on the stator parallel to and above the first metallic counter-shrink plate within the cavity.

12. A distributor as in claim 11, wherein the another longitudinal axis of each radial passage is substantially perpendicular to the first longitudinal axis, and the second longitudinal axis of the stator is substantially perpendicular to the first longitudinal axis.

13. A distributor as in claim 11, further comprising a first low-friction interface means between the stator and the first metallic counter-shrink plate.

14. A distributor as in claim 11, further comprising a second low-friction interface means between the stator and the second metallic counter-shrink plate.

15. A distributor as in claim 11, further comprising a tube in communication with and extending from the radial passage.

16. A distributor as in claim 11, wherein the second end of the rotor is connected to the turret plate.

17. A distributor as in claim 16, wherein the second end of the stator is spaced apart from the turret plate.

* * * * *